(12) United States Patent
Kawabata et al.

(10) Patent No.: US 9,520,582 B2
(45) Date of Patent: Dec. 13, 2016

(54) BATTERY HOLDER AND MOBILE ILLUMINATION DEVICE USING SAME

(71) Applicant: PANASONIC CORPORATION, Osaka (JP)

(72) Inventors: Katsumasa Kawabata, Osaka (JP); Miho Shirakawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 20 days.

(21) Appl. No.: 14/354,077

(22) PCT Filed: Nov. 30, 2012

(86) PCT No.: PCT/JP2012/007701
§ 371 (c)(1),
(2) Date: Apr. 24, 2014

(87) PCT Pub. No.: WO2014/006665
PCT Pub. Date: Jan. 9, 2014

(65) Prior Publication Data
US 2014/0286001 A1 Sep. 25, 2014

(30) Foreign Application Priority Data
Jul. 4, 2012 (JP) .................................. 2012-150776

(51) Int. Cl.
*H01M 2/10* (2006.01)
*F21L 4/00* (2006.01)
(Continued)

(52) U.S. Cl.
CPC .............. *H01M 2/1044* (2013.01); *F21L 4/00* (2013.01); *F21V 23/00* (2013.01); *A44C 15/0015* (2013.01)

(58) Field of Classification Search
CPC ... H01M 2/00–2/0202; H01M 2/0207–2/0235; H01M 2/0222; H01M 2/04–2/0404; H01M 2/1044; F21L 4/00; F21V 23/00
See application file for complete search history.

(56) References Cited

U.S. PATENT DOCUMENTS 5,369,802 A * 11/1994 Murray ............... H01M 2/1044
340/7.63
5,843,595 A 12/1998 Kawakatsu

FOREIGN PATENT DOCUMENTS

| JP | 59-146861 U | 10/1984 |
| JP | 04-002044 A | 1/1992 |

(Continued)

OTHER PUBLICATIONS

International Search Report issued in PCT/JP2012/007701, dated Feb. 26, 2013, with English translation.

*Primary Examiner* — Anh Mai
*Assistant Examiner* — Nathaniel Lee
(74) *Attorney, Agent, or Firm* — McDermott Will & Emery LLP

(57) ABSTRACT

A compartment accommodates a button cell. The compartment includes an opening side through which the button cell is loaded or ejected from a side surface of the buttons cell. The compartment includes an upper side, a lower side, and lateral sides for holding flat surfaces and the side surface of the button cell. The compartment includes elastic pieces for biasing at least one of the flat surfaces or the side surface of the button cell. A slit is disposed on at least one of the upper side, the lower side, or the lateral sides. The slit extends from a side opposite to the opening side toward the opening side. The slit extends to a part of the button cell.

7 Claims, 6 Drawing Sheets

(51) Int. Cl.
*F21V 23/00* (2015.01)
*H01M 2/02* (2006.01)
*A44C 15/00* (2006.01)

(56) References Cited

FOREIGN PATENT DOCUMENTS

| | | | |
|---|---|---|---|
| JP | 06-44952 A | | 2/1994 |
| JP | 06-163016 A | | 6/1994 |
| JP | 09-045302 A | | 2/1997 |
| JP | 10-284030 A | | 10/1998 |
| JP | 2005-243538 A | | 9/2005 |
| JP | 2005243538 A | * | 9/2005 |

* cited by examiner

FIG.4
(a)
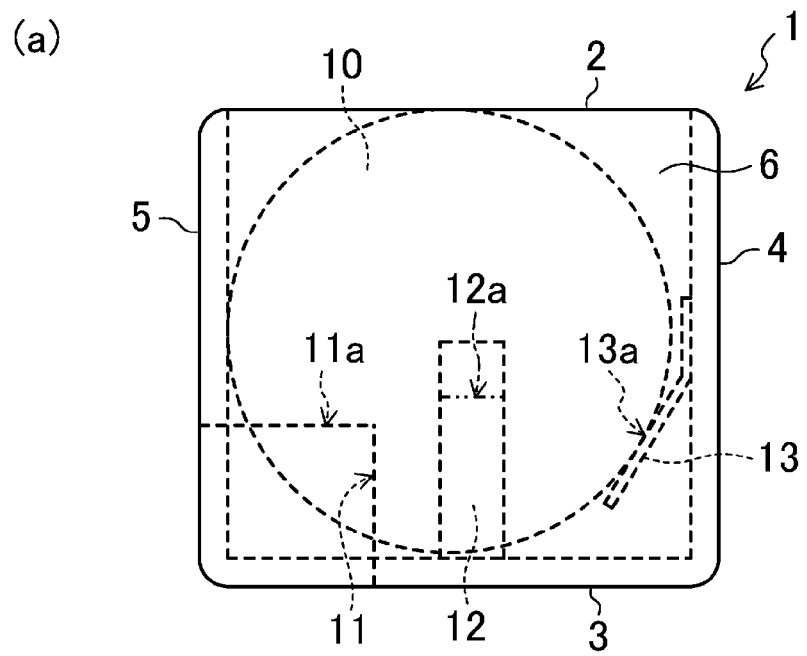
(b)
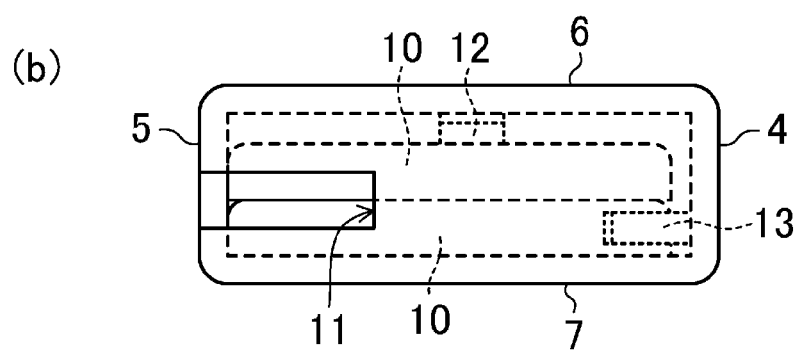
(c)
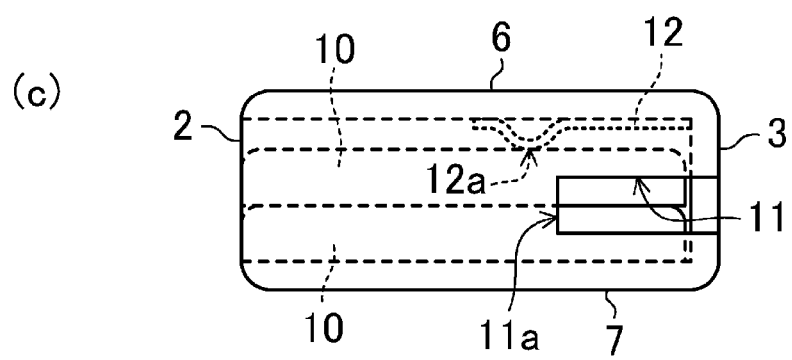

FIG.5
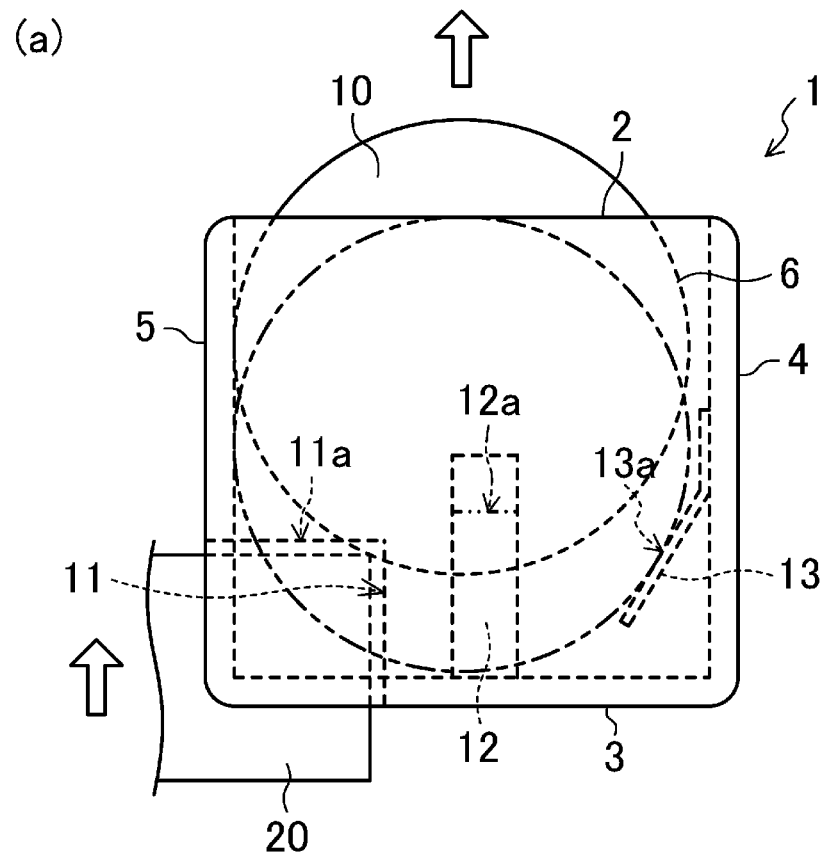
(a)
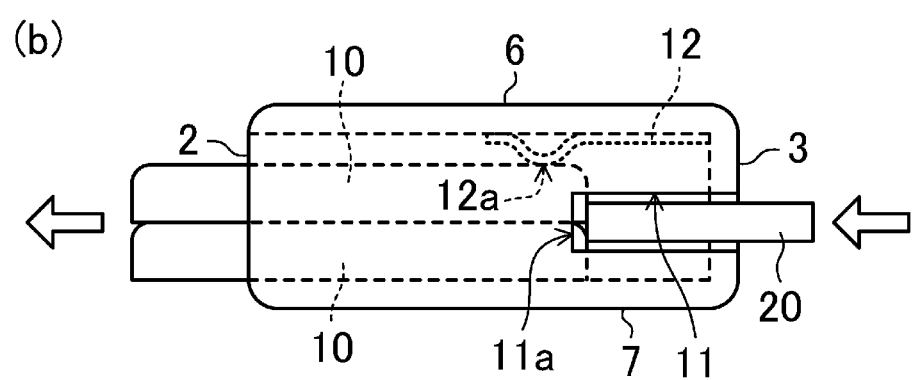
(b)

BATTERY HOLDER AND MOBILE ILLUMINATION DEVICE USING SAME

RELATED APPLICATIONS

This application is the U.S. National Phase under 35 U.S.C. §371 of International Application No. PCT/JP2012/007701, filed on Nov. 30, 2012, which in turn claims the benefit of Japanese Application No. 2012-150776, filed on Jul. 4, 2012, the disclosures of which Applications are incorporated by reference herein.

TECHNICAL FIELD

The present invention relates to a cell holder including a compartment for accommodating a button cell, and a portable illumination device with this cell holder.

BACKGROUND ART

Some electronics devices include a detachable cell holder that holds a button cell supplying power to the electronics devices. See, e.g., PATENT DOCUMENTS 1 and 2. This cell holder includes a compartment and a stopper. The compartment holds a button cell. The stopper enables the cell holder to be mounted on and fixed to the electronics device. The cell holder is detached from the electronics device with the stopper released.

This button cell held by the cell holder mounted on the electronics device is not slipped out of the electronics device. However, the cell holder requires the stopper to be detachably mounted on the electronics device. The electronics device also requires an engagement part for engaging with the stopper. Thus, the cell holder and the electronics device have complex structures.

PATENT DOCUMENT 3 discloses a cell holder integrated with an IC package. This cell holder includes a compartment, a first elastic electrode terminal, a second elastic electrode terminal, and stoppers. The compartment accommodates a coin cell. The first elastic electrode terminal presses a peripheral surface of the coin cell. The second elastic electrode terminal is in contact with a bottom surface of the coin cell. The stoppers hold a part of a coin cell accommodated. The compartment accommodates the coin cell, which is held by the stoppers so as not to be slipped out unintentionally. The coin cell is released from the stoppers by a stick-type tool inserted into a space between an inner periphery of the compartment and the peripheral surface of the coin cell. Then, the coin cell is pushed and ejected to the outside of the cell holder by an elastic force of the first electrode terminal.

CITATION LIST

Patent Document

PATENT DOCUMENT 1: Japanese Unexamined Patent Publication No. H6-163016
PATENT DOCUMENT 2: Japanese Unexamined Patent Publication No. H9-45302
PATENT DOCUMENT 3: Japanese Unexamined Patent Publication No. H6-44952

SUMMARY OF THE INVENTION

Technical Problem

PATENT DOCUMENT 3 discloses the cell holder that is certainly simple and prevents the cell in the compartment from being slipped out unintentionally. However, the cell is ejected with the tool in the following complex, inconvenient manner. The stick-type tool is inserted into the space between the inner periphery of the compartment and the peripheral surface of the coin cell. Then, the coin cell is pivoted at one of the stopper and moved toward the other stopper against the elastic force of the first electrode terminal. Then, the coin cell is released from the former stopper. Then, the coin cell is pushed out by the elastic force of the first electrode terminal. In addition, for the removal, the coin cell is moved with the stick-type tool toward the other stopper against the elastic force of the first electrode terminal. Then, the cell is released with this elastic force. Thus, the cell might be ejected quickly from the cell holder, and might be lost.

It is a principal object of the present invention to provide a simple cell holder that prevents a cell in a compartment from being slipped out unintentionally, and releases the cell with ease.

Solution to the Problem

The cell holder of the present invention includes a compartment for accommodating a button cell. The compartment includes an opening side through which the button cell is loaded or ejected from a side surface of the button cell; an upper side, a lower side, and lateral sides for holding flat surfaces and the side surface of the button cell; and an elastic piece for biasing at least one of the flat surfaces or the side surface of the button cell. A slit is disposed on at least one of the upper side, the lower side, or the lateral sides. The slit extends from a side opposite to the opening side toward the opening side. The slit extends to a part of the button cell.

This configuration enables the elastic piece to bias the button cell held by the upper side, the lower side, and the lateral sides of the compartment. Thus, this prevents the button cell from being slipped out unintentionally from the compartment. The button cell is also partially pushed out of the compartment by moving a plate tool toward the opening side along a slit disposed on a side opposite to the opening side. Thus, it is easy to pull out the button cell from the compartment.

A biasing portion where the elastic piece biases the button cell is also preferably positioned closer to the opening side than an end of the slit near the opening side is.

This configuration enables the elastic piece to keep biasing the button cell that is partially pushed out of the opening side. Thus, when the button cell is partially pushed out of the opening side with the plate tool, the button cell is unable to be ejected quickly from the cell holder, and thus unable to be lost.

Advantages of the Invention

The present invention provides a simple cell holder that prevents a cell in a compartment from being slipped out unintentionally, and releases the cell with ease.

BRIEF DESCRIPTION OF THE DRAWINGS

FIG. 1 is a schematic view of a configuration of a cell holder of one embodiment of the present invention.

FIG. 3(a) is a top view. FIG. 3(b) is a side view taken from a lateral side 3. FIG. 3(c) is a bottom view.

FIG. 4 is a schematic view of a configuration of a cell holder of another alternative example of this embodiment. FIG. 4(a) is a top view. FIG. 4(b) is a side view taken from a lateral side 3. FIG. 4(c) is a side view taken from a lateral side 5.

FIG. 5 illustrates that the cell in the compartment is being ejected from the opening side. FIG. 5(a) is a top view. FIG. 5(b) is a side view taken from the lateral side 5.

DESCRIPTION OF EMBODIMENTS

Embodiments of the present invention will be described in detail below with reference to the drawings. The present invention is not limited to the following embodiments. The present invention may be modified within the scope of its advantage.

Figure 1A:
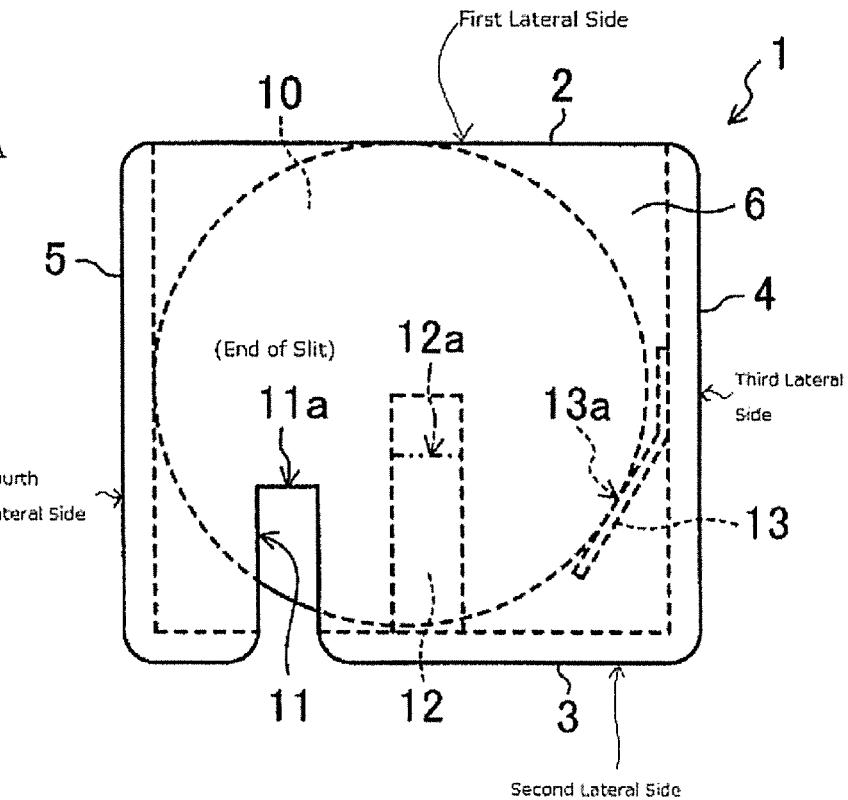
FIG. 1(a) is a top view.
Figure 1B:
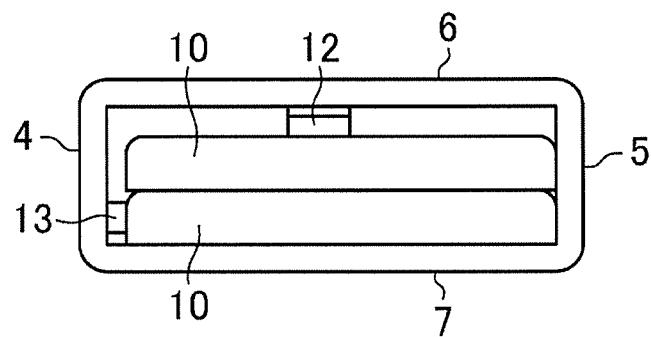
FIG. 1(b) is a side view taken from an opening side 2 of a compartment.
Figure 1C:
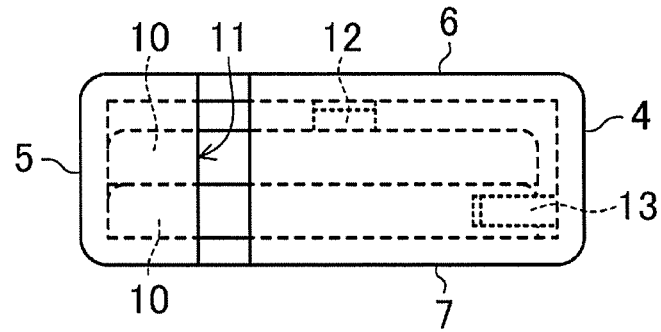
FIG. 1(c) is a side view taken from a lateral side 3.

FIG. 1 is a schematic view of a configuration of a cell holder of one embodiment of the present invention. FIG. 1(a) is a top view. FIG. 1(b) is a side view taken from an opening side 2 of a compartment 1. FIG. 1(c) is a side view taken from a lateral side 3.

The cell holder of this embodiment includes a compartment 1 for accommodating button cells. In this embodiment, the button cell is defined as a cell shaped as a button (a thin cylinder). The button cell may be any type. For example, the button cell may be a primary battery or a secondary battery. The button cell may also be a coin cell. The button cell is hereinafter referred to as a "cell."

FIGS. 1(a)-1(c) illustrate the compartment 1 including an upper side 6, a lower side 7, and four lateral sides 2, 3, 4, and 5. These elements form a space for accommodating two stacked cells. One of the four lateral sides serves as an opening side 2 from which cells 10 are ejected or loaded.

The upper side 6 includes an elastic piece 12 for biasing a top surface of the cell 10. The lateral side 4 includes an elastic piece 13 for biasing a side surface of the cell 10. Specifically, at a biasing portion 12a, the elastic piece 12 biases the top surface of the cell 10 in the compartment 1. At a biasing portion 13a, the elastic piece 13 biases the side surface of the cell 10 in the compartment 1. In other words, the elastic pieces 12 and 13 bias the flat surfaces (the top surface and the bottom surface) and the side surface of the cell 10 in the compartment 1 so that the upper side 6, the lower side 7, and the lateral sides 3, 4, and 5 fix and hold the cell 10 in the compartment 1. That is, the cell 10 loaded from the opening side 2 and accommodated in the compartment 1 is not slipped out unintentionally from the opening side 2. If the top surface (or the bottom surface) and the side surface of the cell 10 serve as positive and negative electrode terminals, the elastic pieces 12 and 13 may also serve as electrode terminals connected with the positive and negative electrode terminals of the cell 10. The elastic pieces 12 and 13 may have any structure, e.g., flat spring.

FIGS. 1(a)-1(c) illustrate the cell holder of this embodiment. This cell holder includes a slit 11 that is disposed over the upper side 6, the lower side 7, and the lateral side 3 of the compartment 1. The slit 11 extends from the side (the lateral side 3) opposite to the opening side 2 toward the opening side 2, and extends to a part of the button cell 10.

In other words, FIG. 1(a) illustrates that the top and side surfaces of the cell 10 in the compartment 1 are partially exposed from the slit 11 when viewed from the upper side 6 and the lower side 7.

Figure 2:
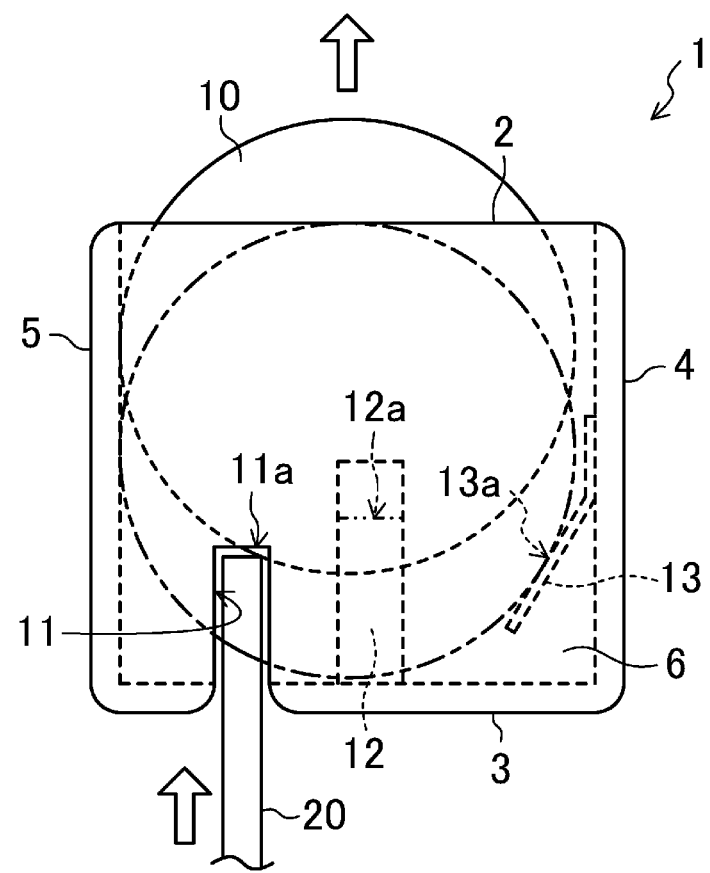
FIG. 2 is a top view showing that a cell in the compartment is being ejected from the opening side.

FIG. 2 is a top view of the compartment 1 of this embodiment showing that the cell 10 in the compartment 1 is being ejected from the opening side 2.

FIG. 2 illustrates that a plate tool 20 is inserted into the slit 11 disposed on the side opposite to the opening side 2. This tool 20 is moved in an arrow direction, i.e., toward the opening side 2 to push out the cell 10 from the opening side 2.

During this time, the slit 11 including inner sides (parallel to the lateral sides 4 and 5) along which the tool 20 moves serves a guide that allows the tool 20 to move smoothly in the arrow direction. This enables the cell 10 to be partially pushed out ejected from the opening side 2 without unnecessary force. It is easy to pull out of the compartment 1 the cell 10 partially exposed from the opening side 2 by picking it with, e.g., fingers. It is also easy to adjust the exposure of the cell 10 from the opening side 2 by adjusting a position of an end 11a of the slit 11. The end 11a is near the opening side 2. For example, it is easy to pull out the cell from the compartment 1 if the exposure of the cell 10 from the opening side 2 is so adjusted that the cell 10 is able to be picked by fingers. It is easier to pull out the cell from the compartment 1 if a notch on a corner on the opening side 2 on the upper side 6 and/or the lower side 7 of the compartment 1 is provided to increase the exposure of the cell 10 from the opening side 2.

FIG. 1(a) illustrates a preferable position of the biasing portion 12a of the elastic piece 12 relative to the cell 10. The biasing portion 12a is positioned closer to the opening side 2 than the end 11a of the slit 11 is.

Thus, as illustrated in FIG. 2, when the tool 20 moves to the end 11a, of the slit 11, near the opening side 2, the biasing portion 12a of the elastic piece 12 is still positioned on the top surface of the cell 10. Thus, the elastic piece 12 keeps biasing the cell 10 pushed out of the opening side 2. Thus, when the cell 10 is partially pushed out of the opening side 2 with the tool 20, the cell 10 is unable to be ejected quickly from the compartment 1, and thus unable to be lost.

The compartment 1 of this embodiment includes the two elastic pieces 12 and 13 for biasing the flat surface and the side surface of the cell 10. FIG. 1(a) illustrates the preferable position of the biasing portion 12a where the elastic piece 12 biases the cell 10. The biasing portion 12a is positioned closer to the opening side 2 than the end 11a of the slit 11 near the opening side 2 is. FIG. 1(a) also illustrates a preferable position of the biasing portion 13a where the elastic piece 13 biases the cell 10. The biasing portion 13a is positioned closer to the side (the lateral side 3) opposite to the opening side 2 than the end 11a, of the slit 11, near the opening side 2 is.

Thus, as illustrated in FIG. 2, when the tool 20 moves to the end 11a, of the slit 11, near the opening side 2, the elastic piece 12 keeps biasing the cell 10 pushed out of the opening side 2 while the elastic piece 13 finishes biasing the cell 10. Thus, the cell 10 partially pushed out and exposed from the opening side 2 with the tool 20 is able to be pulled out with less force while being prevented from being ejected quickly from the compartment 1.

FIG. 2 illustrates as an example that the elastic piece 12 keeps biasing the cell 10 pushed out of the opening side 2 (biasing the top surface of the cell 10) while the elastic piece 13 finishes biasing the cell 10 (biasing the side surface of the cell 10). In reverse, the elastic piece 13 may keep biasing the cell 10 (biasing the side surface of the cell 10), and the elastic piece 12 may finish biasing the cell 10 (biasing the top surface of the cell 10). To more securely prevent the cell 10 from being ejected quickly from the compartment 1, both the elastic pieces 12 and 13 may keep biasing the cell 10 (biasing the top surface and the side surface of the cell 10).

The slit 11 may be any size in width. A preferable width is less than 5.6 mm that is a diameter of a test finger defined by International Electrotechnical Commission (IEC) 61032. This test finger is used as a finger of a child of 1-3 year old. This size prevents the child from ejecting and swallowing the cell 10 by mistake.

Figure 3:
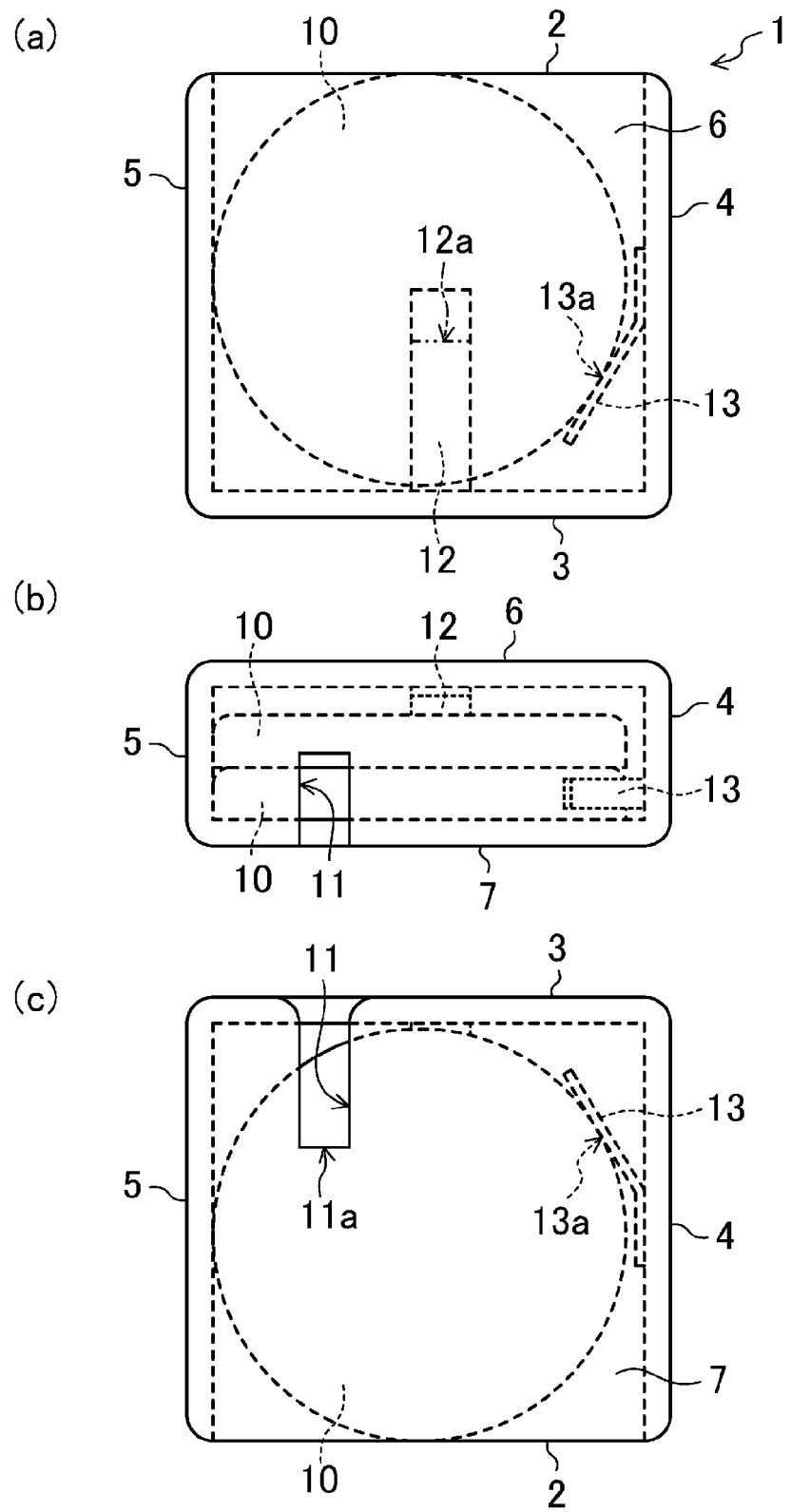
FIG. 3 is a schematic view of a configuration of a cell holder of an alternative example of this embodiment.

FIG. 3 is a schematic view of a configuration of a cell holder of an alternative example of this embodiment. FIG. 3(a) is a top view. FIG. 3(b) is a side view taken from a lateral side 3. FIG. 3(c) is a bottom view.

This alternative example differs from the embodiment in FIGS. 1(a)-1(c) in the aspect of the slit 11.

FIGS. 3(a)-3(c) illustrate a slit 11 of this alternative example. The slit 11 is disposed over a lower side 7 and the lateral side 3 of a compartment 1. The slit 11 extends from a side (the lateral side 3) opposite to an opening side 2 toward the opening side 2, and extends to a part of a cell 10. FIG. 3(c) also illustrates the compartment 1 viewed from the lower side 7. A bottom surface of the cell 10 in this compartment 1 is partially exposed from the slit 11. FIG. 3(b) illustrates the compartment 1 viewed from the lateral side 3. Both the two cells 10 in this compartment 1 have the side surfaces that are at least partially exposed from the slit 11 in order to be ejected together.

This alternative example is useful and advantageous because the slit 11 is able to be disposed on the lower side 7, for example, if the upper side 6 of the compartment 1 has no space for the slit 11 other than a space for the elastic piece 12.

The cell 10 of this alternative example is ejected similarly to that in FIG. 2.

FIG. 4 is a schematic view of a configuration of a cell holder of another alternative example of this embodiment. FIG. 4(a) is a top view. FIG. 4(b) is a side view taken from a lateral side 3. FIG. 4(c) is a side view taken from a lateral side 5.

FIGS. 4(a)-4(c) illustrate a slit 11 of this alternative example. The slit 11 is disposed over the lateral sides 3 and 5 of a compartment 1. The slit 11 extends from a side (the lateral side 3) opposite to an opening side 2 toward the opening side 2, and extends to a part of a cell 10. FIGS. 4(b) and 4(c) also illustrate the compartment 1 viewed from the lateral sides 3 and 5. The side surface of the cell 10 is partially exposed from the slit 11. The lateral side 3 having the slit 11 is opposite to the opening side 2. The lateral side 5 having the slit 11 is opposite to the lateral side 4 having an elastic piece 13. FIGS. 4(b) and 4(c) illustrate that both the two cells 10 have the side surfaces that are at least partially exposed from the slit 11 in order to be ejected together.

FIG. 5 illustrates that a cell 10 in a compartment 1 of this alternative example is being ejected from an opening side 2. FIG. 5(a) is a top view. FIG. 5(b) is a side view taken from a lateral side 5.

FIGS. 5(a) and 5(b) illustrate a plate tool 20 inserted into a slit 11 disposed on a side opposite to the opening side 2. This tool 20 is moved in an arrow direction, i.e., toward the opening side 2 to partially push out the cell 10 from the opening side 2.

During this time, the slit 11 including inner sides (parallel to an upper side 6 and a lower side 7) along which the tool 20 moves serves as a guide that allows the tool 20 to move smoothly in the arrow direction. This guide enables the cell 10 to be securely partially pushed out of the opening side 2 without unnecessary force.

This alternative example is useful when the use of the upper side 6 and the lower side 7 is restrictive in various cases. Specifically, it is useful when the upper side 6 and the lower side 7 have no space for the slit 11 due to, e.g., a guide rib or a tab for mounting the cell holder to, e.g., a device, or due to a sign such as a direction of the cell insertion.

Next, an application of the cell holder of the present invention to an electronics device to which a button cell in the cell holder supplies power will be described.

Figure 6:
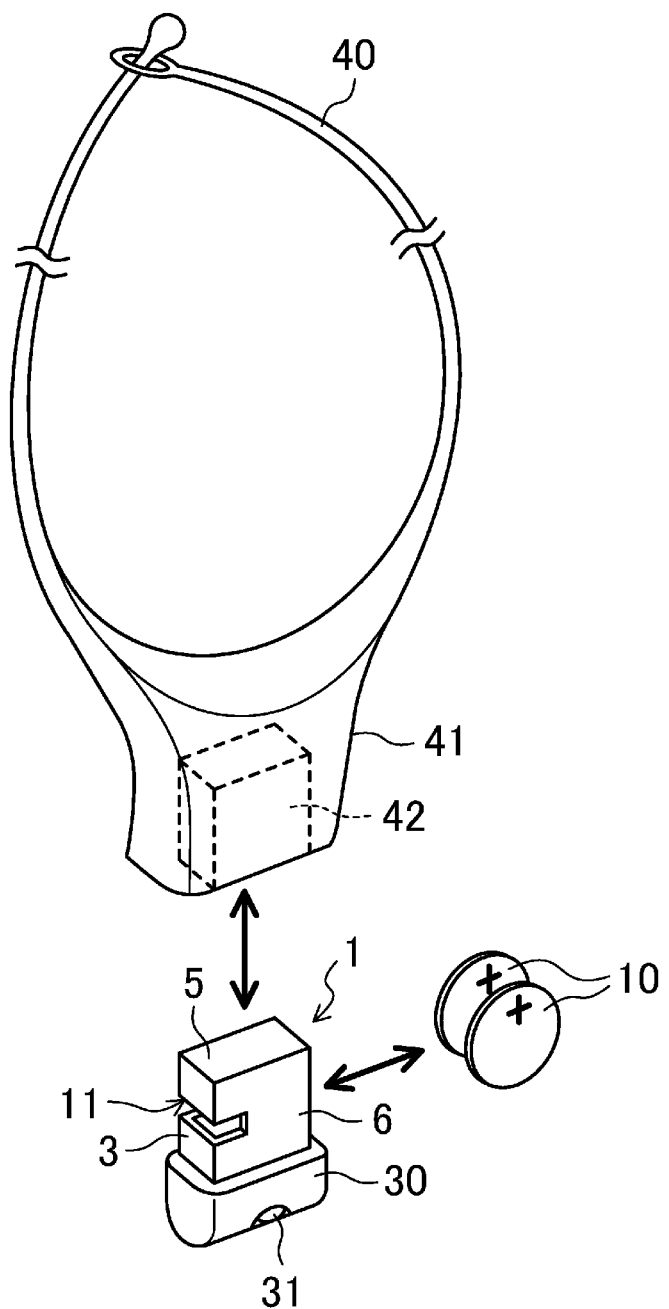
FIG. 6 is a perspective view showing a configuration of a portable illumination device including the cell holder of the present invention and an illumination part. The cell holder is integrated with the illumination part.

FIG. 6 is a perspective view showing a configuration of a portable illumination device including the cell holder of the present invention. The cell holder is integrated with an illumination part to which the cell 10 supplies power.

FIG. 6 illustrates that the cell holder includes the compartment 1 integrated with an illumination part 30 including a light source 31 for illumination. The illumination part 30 includes a conducting plate (not shown) electrically connected with the electrode terminals (the elastic pieces) 12 and 13. These electrode terminals 12 and 13 are connected with the positive and negative electrodes of the cell 10 in the compartment 1. This enables power to be supplied to the light source 31 of the illumination part 30. The illumination part 30 also includes a switch (not shown) that operates a power supply to the light source 31. The cell holder includes the compartment 1 detachably mounted to a cavity 42 of a holding part 41 disposed on an end of a neck strap 40 while accommodating the cell 10.

Regardless of the above preferable embodiments, various modifications may be introduced. While the compartment 1 of the above embodiment accommodates the two stacked cells, it may accommodate any number of the cells 10, e.g., only one cell. The compartment 1 is not limited to a generally cuboid shape, and only has to be such a shape that fixes and regulates the cell 10 in the compartment 1. The "cell holder" of the present invention may be integrated with not only the compartment 1 accommodating the cell 10 but also other parts of, e.g., an electronics device.

INDUSTRIAL APPLICABILITY

The present invention is useful for a cell holder for accommodating a button cell that supplies power to an electronics device.

DESCRIPTION OF REFERENCE CHARACTERS

1 Compartment
2 Opening Side of Compartment
3, 4, 5 Lateral Side of Compartment
6 Upper Side of Compartment
7 Lower Side of Compartment
10 Button Cell
11 Slit
11a End of Slit
12, 13 Elastic Piece
12a, 13a Biasing Section
20 Tool
30 Illumination Part
31 Light Source
40 Neck Strap
41 Holding Part
42 Cavity

The invention claimed is:

1. A cell holder with a compartment for accommodating a button cell, wherein:
   the compartment is a casing including four lateral sides, an upper side, and a lower side,
   the four lateral sides includes:
      a first lateral side having an opening side through which the button cell is loaded or ejected from a side surface of the button cell,
      a second lateral side opposite to the first lateral side, and
      third and fourth lateral sides perpendicular to the first and second lateral sides,
   the compartment includes an elastic piece for biasing at least one of flat surfaces or the side surface of the button cell,
   a slit is disposed on at least one of the upper side and the lower side,
   the slit extends from the second lateral side toward the first lateral side, and extends to a part of the button cell,
   the slit includes an end positioned closer to the first lateral side, and has a long narrow rectangular shape in plan view, and the slit has a width of less than 5.6 mm, and
   the end of the slit is positioned closer to the second lateral side than the biasing portion where the elastic piece biases the button cell.

2. The cell holder of claim 1, wherein
   the compartment includes two elastic pieces for biasing the flat surface and the side surface of the button cell,
   a portion where one of the elastic pieces biases the button cell is positioned closer to the opening side than the end of the slit is, and
   a portion where the other elastic piece biases the button cell is positioned closer to a side opposite to the opening side than the end of the slit is.

3. The cell holder of claim 1, wherein the elastic piece serves as an electrode terminal connecting with a positive electrode or a negative electrode of the button cell.

4. The cell holder of claim 1, wherein the compartment accommodates two or more of the button cells that are stacked.

5. A portable illumination device, comprising:
   the cell holder of claim 1;
   an illumination part integrated with the cell holder; and
   a neck strap, wherein
   the illumination part is coupled with the compartment of the cell holder,
   the button cell supplies power to the illumination part, and
   the compartment is detachably mounted in a holding part disposed on an end of the neck strap.

6. The cell holder of claim 1, wherein the slit does not extend to any of the first lateral side, the third lateral side or the fourth lateral side.

7. The cell holder of claim 1, wherein the four lateral sides define a perimeter of the casing, and the button cell does not extend beyond the perimeter of the casing when the button cell is disposed in the compartment.

* * * * *